June 16, 1953  M. S. WORLEY  2,641,844
CROSS-COUNTRY NAVIGATIONAL INSTRUMENT
Filed Sept. 26, 1951  2 Sheets-Sheet 1
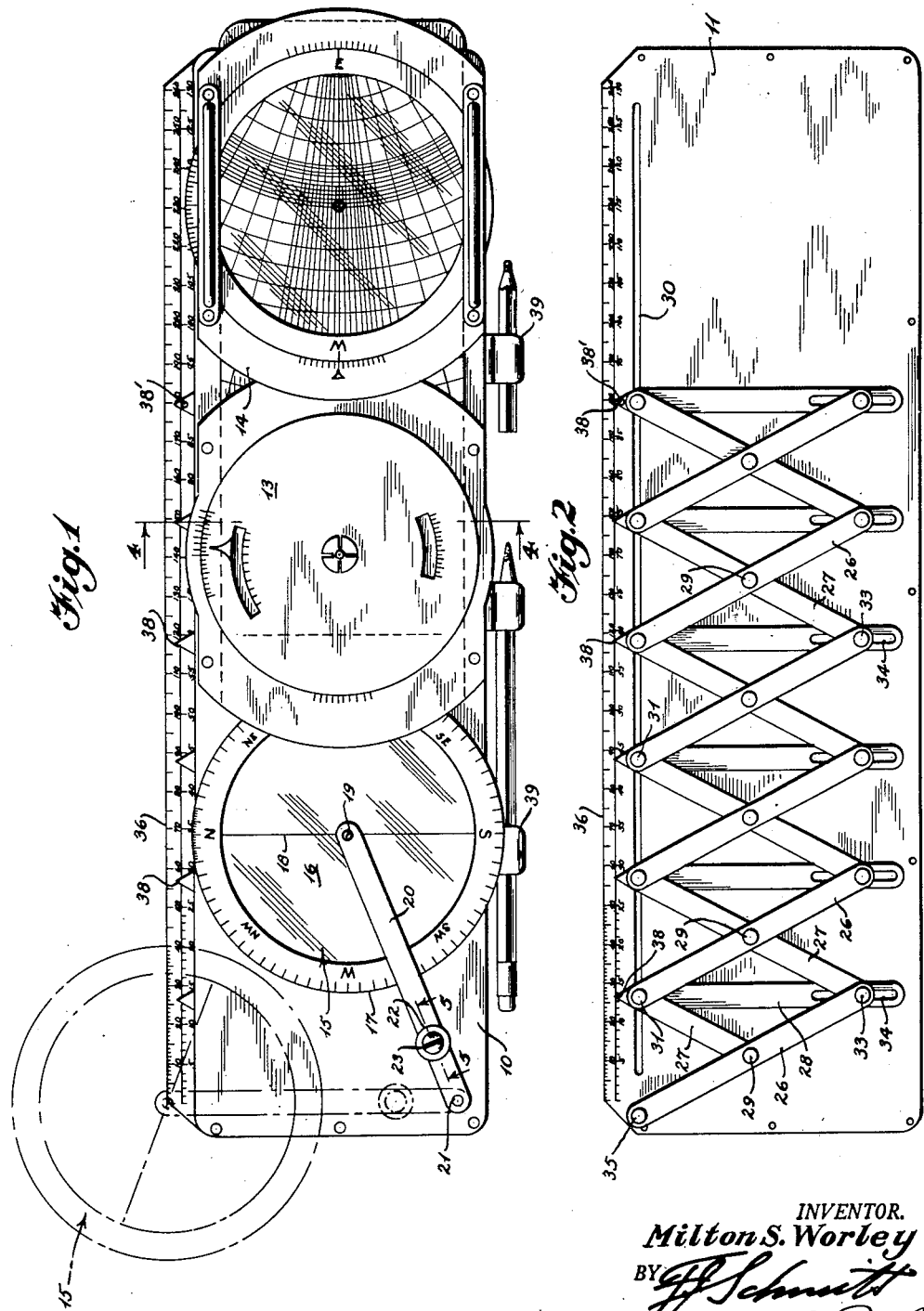
INVENTOR.
Milton S. Worley
BY June 16, 1953  M. S. WORLEY  2,641,844
CROSS-COUNTRY NAVIGATIONAL INSTRUMENT
Filed Sept. 26, 1951  2 Sheets-Sheet 2
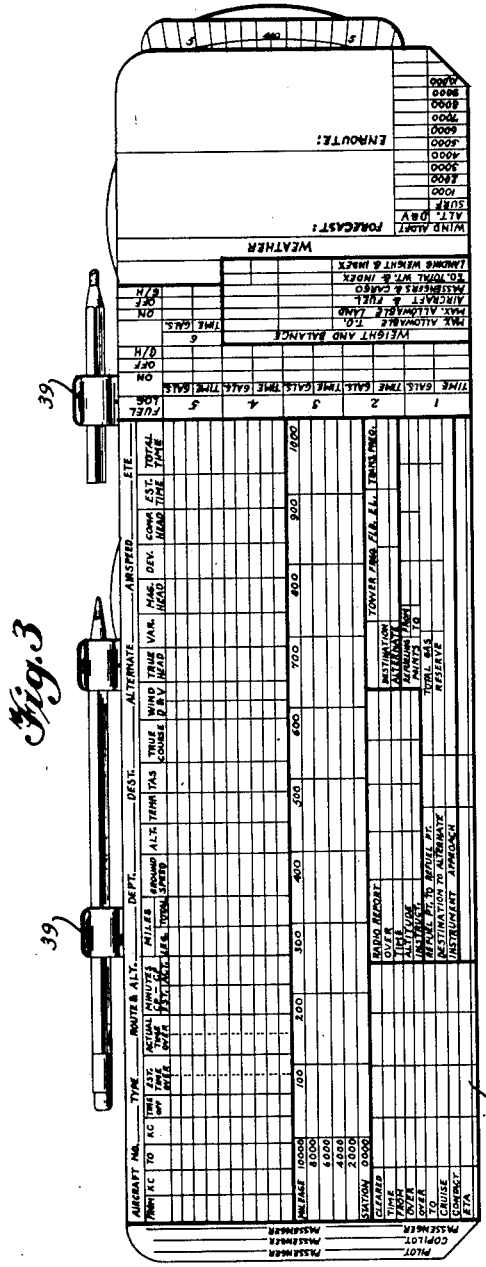
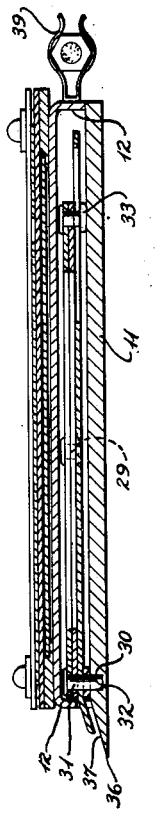
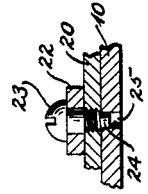
INVENTOR.
Milton S. Worley
BY
Walter S. Pawl.
Attorneys Patented June 16, 1953

2,641,844

UNITED STATES PATENT OFFICE 2,641,844

CROSS-COUNTRY NAVIGATIONAL INSTRUMENT

Milton S. Worley, Seattle, Wash.

Application September 26, 1951, Serial No. 248,437

1 Claim. (Cl. 33—75)

(Granted under Title 35, U. S. Code (1952), sec. 266)

The present invention relates to navigational instruments and more particularly to an aircraft navigational instrument which provides the pilot with an accurate record of his position and facilitates cross-country flying.

The equipment now used in cross-country aircraft navigation is of varied design but normally includes a drift computer and a dead-reckoning computer. These two instruments may be mounted on each other back to back for compactness. The information obtained from this combined device is varied and includes true ground speed, true air speed, true heading, altitude corrections and various conversion scales. This information is normally used by the pilot as he flys from one position to another and other instruments must be used to determine his position on a chart. The pilot must use a straight edge, which is an added piece of equipment to carry around, to determine his flight trace. This is marked off on the chart and the pilot must determine the distance by reference to a scale provided on the chart. Then he must manually divide off the mileage at intervals, taking into consideration his true ground speed, to determine his estimated time of arrival at a particular position. This calculation of course calls for computations to be performed by the pilot with results that are not always correct. Furthermore, the time required for the calculations leads to the possibility that the pilot will become lost before he can determine his position. Entirely too often aircraft have been lost while engaged in a routine cross-country flight. One of the primary reasons is due to the fact that the pilot has failed to maintain an accurate record of his position.

It is an object of the present invention to incorporate the many features and devices necessary for aircraft navigational purposes into a single instrument which is compact in design and efficient in operation.

A further object of the invention is to provide an instrument as described above which includes a straight-edge calibrated in accordance with the mileage scales on both sectional and regional charts, and a plurality of divider means for determining fractional intervals of a given number of miles for conversion to predetermined time units.

Another object of this invention is to provide an instrument having a straight-edge, as described above, and including a circular compass rose pivotally mounted on the instrument so that its center can be positioned on said straight-edge, and when the latter is placed on a chart, furnish the relative angle between the straight-edge and a meridian line of the chart. This gives a quick reading of the course followed or the course which the pilot must follow.

For a more complete understanding of the invention and for other objects and advantages thereof, reference should now be had to the following description in connection with the accompanying drawing, in which:

Fig. 1 is a front plan view of the device showing the mounted position of the computers, the compass rose being shown in its operative and inoperative positions, the latter being shown in full lines;

Fig. 2 is a plan view of the instrument with the front plate removed to show the divider means;

Fig. 3 is a reverse plan view of the instrument showing a flight log form inscribed thereon;

Fig. 4 is a sectional view taken on lines 4—4 of Fig. 1;

Fig. 5 is an enlarged sectional view taken on lines 5—5 of Fig. 1.

Similar reference characters represent similar parts.

The present invention comprises a top or front plate 10 and a bottom or back plate 11, both said plates being generally rectangular in configuration. Short downturned flanges 12 are formed on the top plate with the free edges thereof being adapted to abut said bottom plate so that said plates will be spaced apart a distance equal to the width of said flanges.

A dead-reckoning computer 13, drift computer 14 and compass rose 15 are mounted in spaced relation on top plate 10 along the length thereof. Computers 13 and 14 are of conventional design and have been shown generally in blank form. The compass rose includes a transparent center section, illustrated by the numeral 16, and an opaque peripheral ring 17. The peripheral ring has the conventional degree numerals from 0°–360° inscribed thereon. A north-south line 18 is inscribed on the center section for convenience in aligning the compass rose with the meridian lines of a chart. Compass rose 15 is rotatably mounted by means of a hollow pin 19 on one end of lever 20, the other end of lever 20 being pivotally connected to one corner of plate 10 by means of pin 21. Pin 19 is of the hollow type in order that the center of compass rose 15 can be accurately determined. Flanges on opposite ends of the pin secures it to the compass rose and lever. A knob 22 is secured to lever 20 intermediate the ends thereof by means of a screw 23, the latter being threadingly received by a threaded aperture in lever 20. The lower tip of screw 23, illustrated by numeral 24, is adapted to be received by either of a pair of apertures 25 in plate 10. It will be understood that one of the apertures in the plate is arranged so that screw tip 24 will fit therein when the compass rose is in its inoperative position, shown in full line in Fig. 1, and another of the apertures is arranged in the plate in a manner to receive the screw tip 24 when the compass rose is in operative position, shown in dotted line in Fig. 1. Sufficient flexibility is provided in the lever and its pivotal connection to plate 10 so that screw tip 24 can be manually removed from its position in either of apertures 25. It will be noted from the drawings that the length of the lever 20 from pivot pin 21 to pivot pin 19 is equal to the distance from pivot pin 21 to the straight edge 36 of plate 11. Thus when the compass rose 15 is positioned in its operative position (shown in dotted lines in Fig. 1) the center of hollow pin 19 intersects straight edge 36.

Top plate 10 has been removed from bottom plate 11 in Fig. 2 and the divider mechanism positioned between the two plates is clearly shown. This mechanism is in the form of a modified lazy-tong linkage comprising a series of diagonal levers pivotally connected at their middle and ends and includes a first set of parallel levers 26 and a second set of parallel levers 27. A third set of parallel levers 28 are connected to the ends of said first and second sets of levers. The mid-point connection of levers 26 and 27 is accomplished by pins 29.

A longitudinal groove 30 is fashioned in plate 11 near one side thereof and in parallelism therewith. The ends of said levers near groove 30 are pivotally connected by pins 31, the lower tips of which, illustrated by numeral 32, are adapted to be received and guided by groove 30. The other ends of the levers are pivotally connected by pins 33 in a manner to be described. Levers 28 are furnished with longitudinal slots 34 near the end thereof. Pins 33 enter apertures in the ends of levers 26 and 27 and are slidably received in slots 34. Any suitable means may be provided on the pin for holding the parts together. It will be understood that these pins may take the form of rivets, bolts or the like, and are not limited to the particular type shown. The free end of lever 26 at one end of the linkage is pivotally mounted on plate 10 by means of pin 35, the latter being positioned adjacent one end of, and in alignment with, groove 30. Slots 34 permit the linkage to be extended and contracted along the length of the plate and maintain parallel levers 28 perpendicular to groove 30.

The side of plate 11, adjacent and parallel to groove 30, is fashioned to form a straight-edge, illustrated by numeral 36. As seen in Fig. 4, the upper surface of this side of the plate tapers outwardly and downwardly from groove 30 to straight-edge 36, this surface being represented by numeral 37. Two scales are inscribed on surface 37, the scale adjacent the edge being numbered from 0-260, and the other scale is numbered from 0-130. These numbers represent miles from the zero point when used on charts. It will be noted that the two sets of scales permit the straightedge to be used on either sectional or regional charts. For example, if a sectional chart is used the inner scale determines the distance from one point to another in miles. The regional charts are drawn to a smaller scale and therefore the outer scale is used.

The end of parallel bars 28 have pointers 38 formed thereon and are bent over into parallelism with surface 37.

The back of plate 11, shown in Fig. 3, has a form inscribed thereon for keeping a log of the flight. The information entered on this form by the pilot is invaluable. Not only is the information used by the pilot during the flight but it also serves as a reference for making various reports after landing.

Spring clips 39 are fixedly secured to one of the flanges 12 and serve to hold pencils of various colors for use in entering data on the instrument.

The operation of the instrument can best be understood by analyzing a typical problem. If the cross-country flight is for several hundred miles, the pilot will first divide the trip into a number of short segments so that there will be provided a number of check points. The distance from one check point to another will vary but for the purposes of the present problem it will be assumed that the distance between a given pair of check points is one hundred miles. The pilot positions straight-edge 36 to intersect said points with the zero point of the straight-edge aligned with the starting point. The pilot uses the dead-reckoning computer to convert the indicated air speed, read from the altimeter, to true air speed. The wind intensity and its direction can be obtained by using the same wind intensity as in the last segment of the flight, corrected by any error determined at the last check point, or it may be obtained from local weather stations.

The true course to be followed for the next segment of the flight is determined by placing the compass rose in its operative position, as shown in dotted line in Fig. 1, with the center of the compass rose aligned with the zero point and the north-south line 18 placed in parallelism with an adjacent meridian on the chart. The degree reading on the compass rose at its point of intersection with straight-edge 36 is the true course. With the true course, the wind intensity and its direction, and the true air speed, the drift computer is utilized to determine the ground speed made good and the heading the pilot must fly. Pointer 38 having the aperture 38' therein, is positioned on the proper scale at the reading equal to the ground speed determined above. Since there are six pointers provided it will be apparent that the flight will be divided into six equal lengths. Therefore the flight for one hour's time will be divided into ten minute intervals. Thus it is possible for the pilot to mark his flight in units of time so that all that need be done to determine the position at any moment is to look at the clock and the chart.

It will be understood, of course, that it may be necessary to mark off new time intervals during the flight as determined by actual time of arrival over the check points.

Many times a pilot will have travelled some distance from his last check point when he receives instructions to proceed to an alternate destination. All that need be done is to look at the clock and chart, determine where his next ten minute fix is located, and then draw a line between this fix and the alternate destination. Then by utilizing the present instrument as described above, the new course, ground speed and true heading can be determined. When the plane arrives at the ten minute fix the pilot turns to the new course. By use of the instrument the time in route to the alternate destination is found so that the pilot can radio ahead his estimated time of arrival.

From the above detailed description it will be apparent to those skilled in the art that I have provided a complete instrument for aircraft navigation. The components of the instrument are compactly arranged so that the instrument as a whole is flat and does not take up an unnecessary amount of space in the compartment.

The instrument divides the flight into time units for quick determination of a fix at any given instant. It is not necessary for the pilot to go through a long series of calculations in order to find his position.

While there has been described what is at present considered the preferred embodiment of the invention, it will be obvious to those skilled in the art that various changes and modifications may be made therein without departing from the true spirit and scope of the invention, as defined in the appended claim.

The invention described herein may be manufactured and used by or for the Government of the United States of America for governmental purposes without the payment of any royalties thereon or therefor.

I claim:

A navigational instrument comprising a base member having a straight edge, a first pivot point on said member, said pivot point being spaced a predetermined distance from a point along said straight edge, a lever, means pivotally mounting said lever on said first pivot point, a second pivot point mounted on said lever and spaced said predetermined distance from said first pivot point, a compass rose, means rotatably mounting said compass rose on said second pivot point, and means for selectively locking said lever in a position such that the axis of rotation of said compass rose will intersect said point on said straight edge.

MILTON S. WORLEY.

References Cited in the file of this patent

UNITED STATES PATENTS

| Number | Name | Date |
| --- | --- | --- |
| 736,168 | Stinson | Aug. 11, 1903 |
| 865,597 | Keuffel | Sept. 10, 1907 |
| 1,304,789 | Marion | May 27, 1919 |
| 1,311,641 | Christensen | July 29, 1919 |
| 1,695,457 | Duncan | Dec. 18, 1928 |
| 2,420,673 | Monrad | May 20, 1947 |
| 2,449,342 | Tardif | Sept. 14, 1948 |
| 2,545,935 | Warner | Mar. 20, 1951 |

FOREIGN PATENTS

| Number | Country | Date |
| --- | --- | --- |
| 14,168 | Great Britain | 1894 |
| 16,576 | Great Britain | 1896 |
| 99,350 | Sweden | July 9, 1940 |
| 738,871 | France | Oct. 18, 1932 |